United States Patent [19]
Omati

[11] Patent Number: 5,661,833
[45] Date of Patent: Aug. 26, 1997

[54] CONNECTION SYSTEM BETWEEN A PRINTED BOARD AND A CABLE AND BUSH FOR USE IN SAID CONNECTION SYSTEM

[75] Inventor: Roberto Omati, Gorgonzola, Italy

[73] Assignee: Alcatel Italia S.p.A., Milan, Italy

[21] Appl. No.: 615,693

[22] Filed: Mar. 13, 1996

[30] Foreign Application Priority Data

Mar. 27, 1995 [IT] Italy ................. MI95A0605

[51] Int. Cl.⁶ ................................. G02B 6/36
[52] U.S. Cl. ............... 385/88; 385/76; 385/77; 385/89; 385/92; 385/138; 385/139
[58] Field of Search ............... 385/76, 77, 78, 385/88, 89, 49, 92, 93, 94, 138, 139

[56] References Cited

U.S. PATENT DOCUMENTS

| 4,081,208 | 3/1978 | Meade ............... | 385/88 X |
|---|---|---|---|
| 4,140,365 | 2/1979 | Burger et al. ....... | 385/77 X |
| 4,548,466 | 10/1985 | Evans et al. ....... | 385/94 X |
| 4,614,873 | 9/1986 | Umeji ............... | 385/92 X |
| 4,720,630 | 1/1988 | Takeuchi et al. ..... | 385/92 X |
| 5,061,033 | 10/1991 | Richard ............. | 385/92 |
| 5,274,729 | 12/1993 | King et al. ......... | 385/134 |
| 5,371,819 | 12/1994 | Szegda .............. | 385/101 X |
| 5,419,717 | 5/1995 | Abendschein et al. .. | 385/139 X |

FOREIGN PATENT DOCUMENTS

| 367215 | 6/1982 | Austria ................ | 385/147 X |
|---|---|---|---|
| 0008979 | 3/1980 | European Pat. Off. .... | 385/88 X |
| 9001866 | 7/1990 | Germany ............... | 385/138 X |
| 1109970 | 4/1968 | United Kingdom ........ | 385/147 X |
| 2119120 | 11/1983 | United Kingdom ........ | 385/88 X |
| 2224891 | 5/1990 | United Kingdom ........ | 385/138 X |

*Primary Examiner*—Brian Healy
*Attorney, Agent, or Firm*—Ware, Fressola, Van Der Sluys & Adlophson

[57] ABSTRACT

The invention relates to a connection system between a printed board and a cable, in particular a fiber optic cable mounting a connector connectable by rotation and to a bush for use in this connection system. The system is characterized by the use of a bush so disposed as to shift on the back-panel the draw out stress exerted on the connector preventing its axial sliding and therefore the drag and rupture of the fiber optic cable if the connector has not been unscrewed in advance.

9 Claims, 3 Drawing Sheets

5,661,833

CONNECTION SYSTEM BETWEEN A PRINTED BOARD AND A CABLE AND BUSH FOR USE IN SAID CONNECTION SYSTEM

TECHNICAL FIELD

The invention relates to a connection system between a printed board and a cable, in particular a fiber optic cable, having a connector connectable by rotation and to a bush for use in said connection system.

BACKGROUND OF THE INVENTION

Usually the printed boards have a connection system on their back side. When they are plugged in an apparatus they are connected to respective back panels through suitable connectors so as to allow the electrical connection between all the printed boards of the apparatus. Often, for various reasons, additional systems are necessary for connecting to cables, which are usually located near the front side of the boards, such as, connections to fiber optic cables. A connection system is also known for fiber optic cables on the back portion of the printed board. Such connection is carried out through snap action connectors of the type SC-PC in such a way that, when the board is drawn out, such connectors break loose releasing it.

However, when an optical connection with a higher coupling degree is desired, connectors connectable by rotation of the screw-in type or the like such as, the FC-PC connectors, which allow a better axial alignment between the two fiber optic cables and therefore a lower dispersion and attenuation of the transmitted light signal are used.

When using this type of connectors, should the printed board be drawn out without first loosening the connectors, all cables connected thereto would be pulled. In case of electrical cables, they would not be subjected to significant damages, but in case of fiber optic cables, such cables would be destroyed.

SUMMARY OF THE INVENTION

In fact, it is known that such cables cannot tolerate small radii of curvature. It is a first object of the present invention to provide a connection system between a printed board and a cable, in particular a fiber optic cable having a connector connectable by rotation which is not subject to the same deficiencies of the aforementioned prior art systems and is particularly simple, effective and reliable.

Another object of the present invention is so to provide a system of the type mentioned at the outset which is easy and inexpensive to manufacture. In accordance with the present invention, these objects are achieved by a connection system between a printed board electrically connected to a back-panel and to at least one cable through first connection means rigidly fixed to said board in its rear portion and second connection means fixedly jointed with said at least one cable and connectable by rotation to said first connection means, characterized in that it comprises third connection means for making said second connection means rigidly fixed relative to said back-panel when said second connection means are connected by rotation to said first connections means.

These objects are also achieved by a bush for use in a connection system between a printed board electrically connected to a back-panel and to at least one cable, characterized by a resilient body substantially in the form of a hollow cylinder having a front face and a rear face both in the form of an annulus and being provided with a circumferential groove on its external lateral surface forming a front external step, and being provided with an internal step on its internal lateral surface in the vicinity of said front face, said body further having a first chamfer at the external circumference of said rear face, a second chamfer at the internal circumference of said front face and a plurality of cuts axially extending from said rear face towards and in the vicinity of said internal step so as to make said body flexible at its rear portion.

The connection system according to the invention is characterized in that the draw-out stress transmitted by the printed board to the connectors is shifted on the back-panel, thus preventing the connector from sliding axially and therefore pulling and destroying the fiber optic cables if the connectors are not disconnected in advance.

A further advantage arises from the fact that, having the bush a length greater than the thickness of the back-panel, it is possible to recover the dimensional tolerances of the assembly (connectors, printed board and back-panel) and thus obtain an effective and efficient connection.

BRIEF DESCRIPTION OF THE DRAWINGS

The aforesaid and other objects and features of the invention will become more apparent and the invention will be better understood by reference to the following description of an embodiment thereof taken in conjunction with the attached drawings wherein.

BEST MODE FOR CARRYING OUT THE INVENTION

Figure 1:
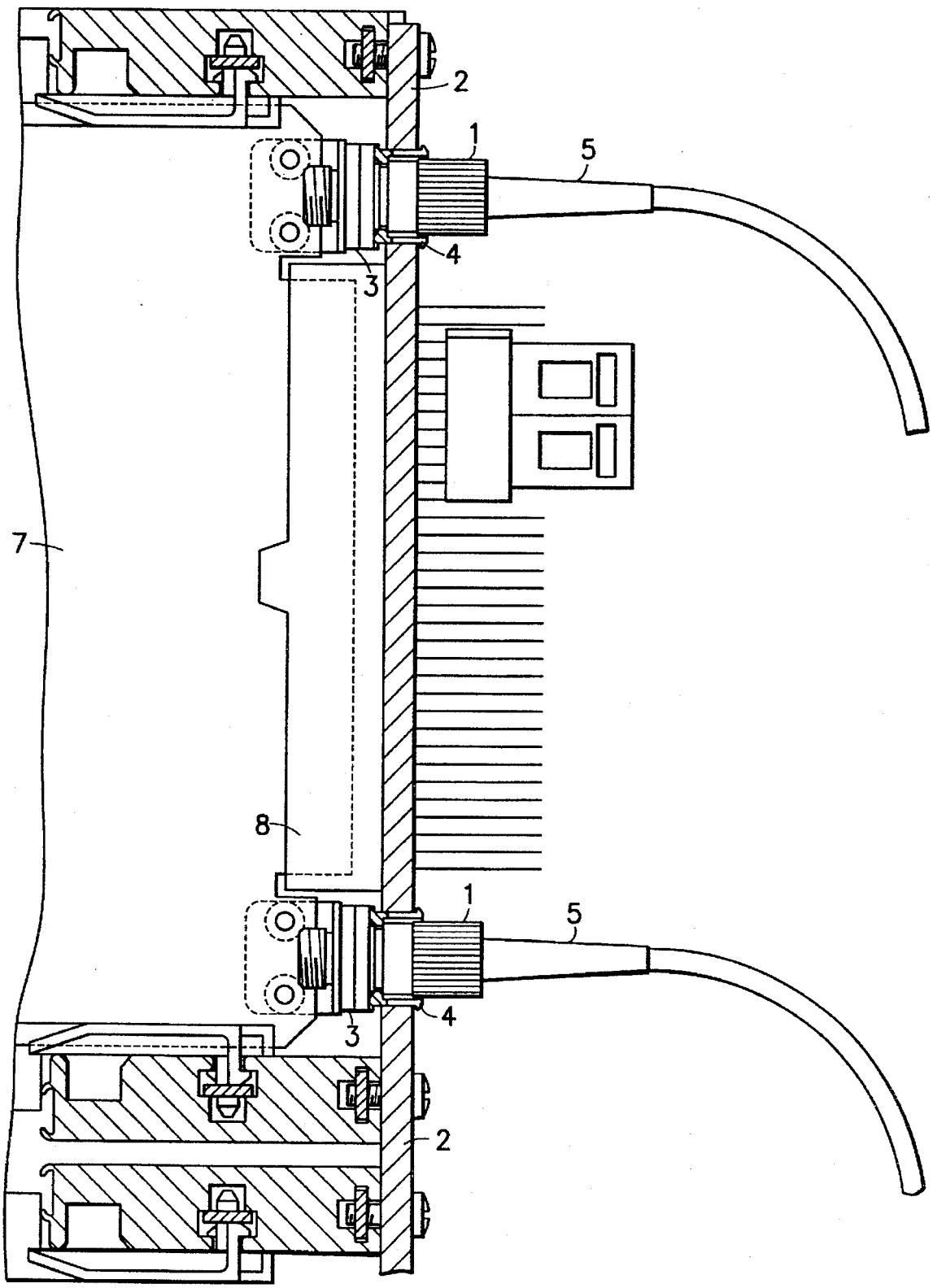
FIG. 1 represents the system for connecting a printed board to a back panel and to cables in accordance with the present invention.

Referring now to the figures in detail, FIG. 1 shows a detail of the electrical connection between a printed board 7 and a back-panel 2 through a conventional electrical connector 8. Further, connections are provided with fiber optic cables 5 (two in the embodiment illustrated in FIG. 1) realized by connection systems in accordance with the present invention.

Fiber optic cables 5 are provided with respective connectors 1 connectable by rotation such as, the so-called FC-PC connectors. They are connectable to corresponding connectors 3, type socket SM, fixedly mounted on the back portion of the printed board 7 and acting as a transition for further connections. Obviously, the connection is carried out through corresponding holes drilled on the back-panel 2.

Figure 2:
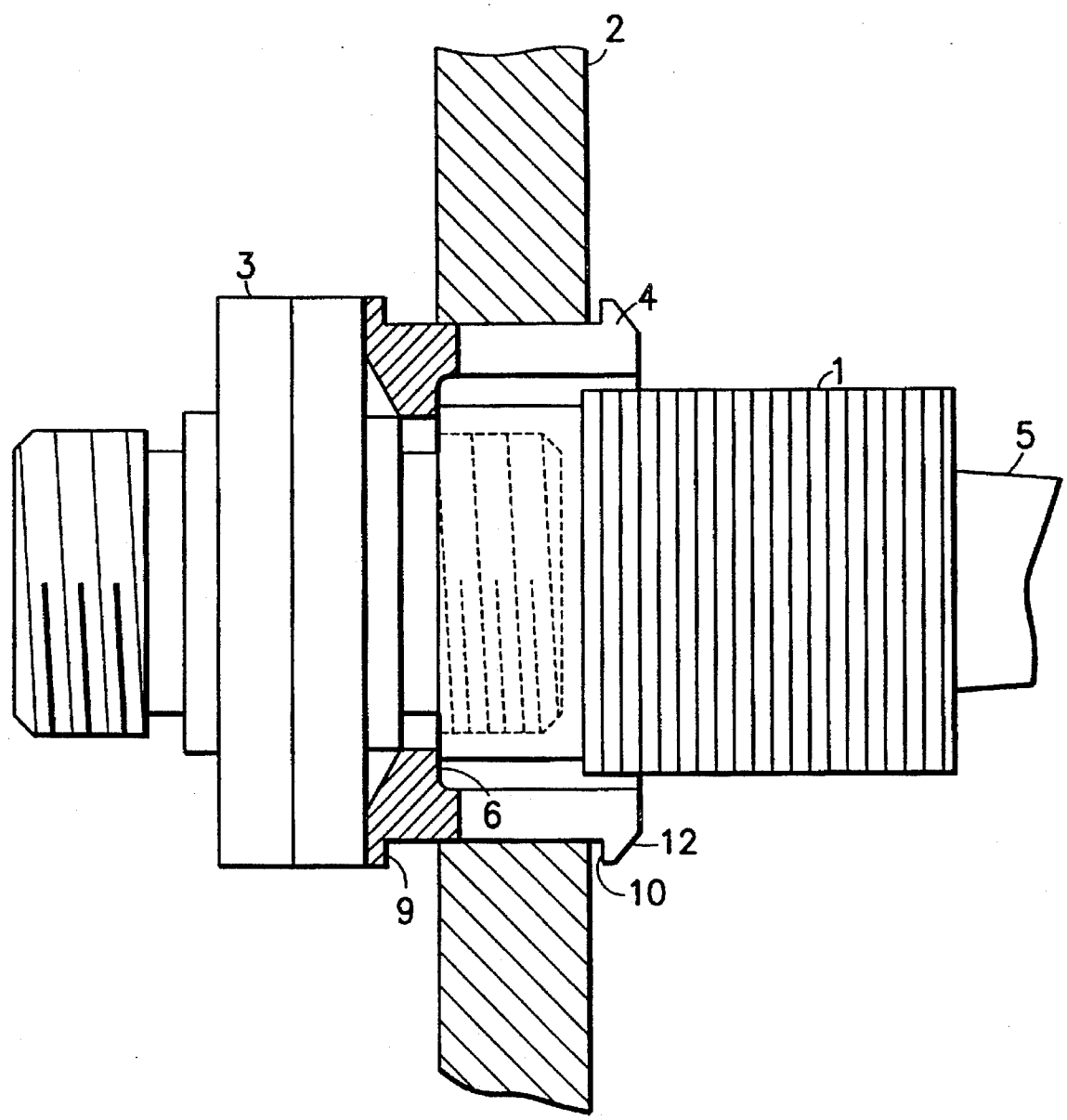
FIG. 2 is an enlarged sectional view of a detail of FIG. 1, and FIG. 3a and b shows a bush to be used in the connection system of FIG. 1 in accordance with the invention.
Figure 3A:
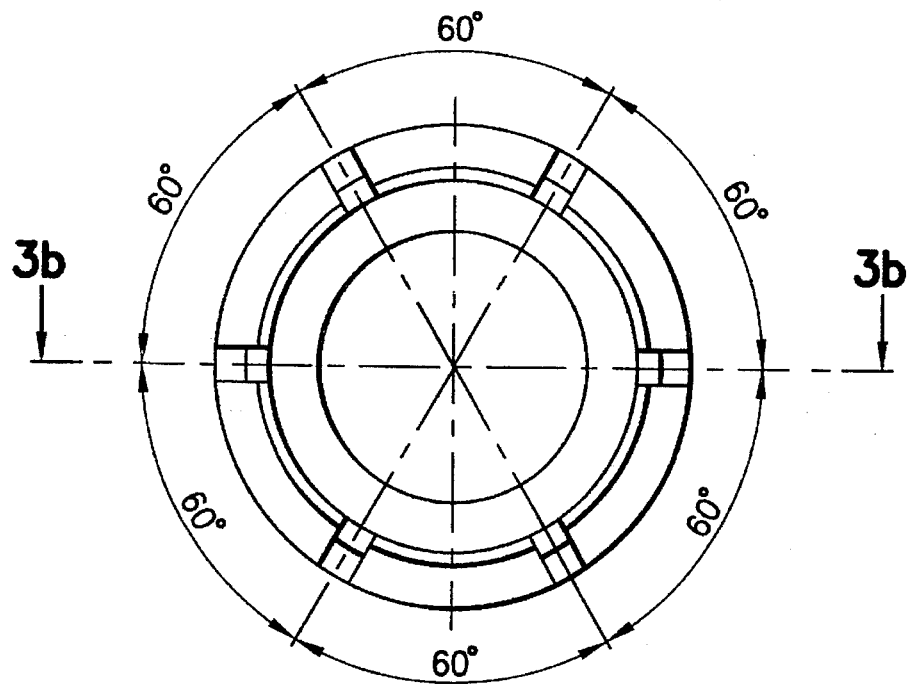

In accordance with the invention, a connection bush 4 fixedly connected with the back-panel 2 is designed to transmit to the back-panel 2 the draw-out stress exerted by the printed board 7 on connector 1 of the fiber optic cable 5 through the connector 3, when connectors 1 and 3 are screwed to each other. In a preferred but not exclusive embodiment, bush 4 is snapped into the corresponding hole provided on back-panel 2 to allow connection of connectors 1 and 3. To this end it is formed (see FIG. 3a and b) by a resilient body (made of plastic or metal) having substantially the shape of a hollow cylinder with its front face 13 in the form of an annulus abutting on the flange of connector 3 (see FIG. 2) and its rear face 14 also in the form of an annulus.

Provided in correspondence with the outside circumference of the rear face 14, there is an external chamfer 12 making an angle of 45° with the axis of the cylinder whose function is to facilitate the insertion of the bush into the corresponding hole of the back panel 2. An internal chamfer 15 making an angle of 60° with the axis of the cylinder is provided at the internal circumference of the front face 13. The inner hole of the hollow cylindrical body has a diameter increased at the rear face 14 so as to form an inner annular step 6 near the inner chamfer, against which the front portion of connector 1 abuts when matched with connector 3. A circumferential groove is provided on the outer lateral surface of the body so as to form a front external step 9 and a rear external step 10, both designed to abut against the corresponding surface of the back-panel 2 making the bush 4 rigidly fixed thereto. The distance between the two external steps 9 and 10 is greater than the thickness of the back-panel 2 (see FIG. 2) in order to recover the dimensional tolerances of connectors 1 and 3, printed board 7 and back-panel 2.

Figure 3B:
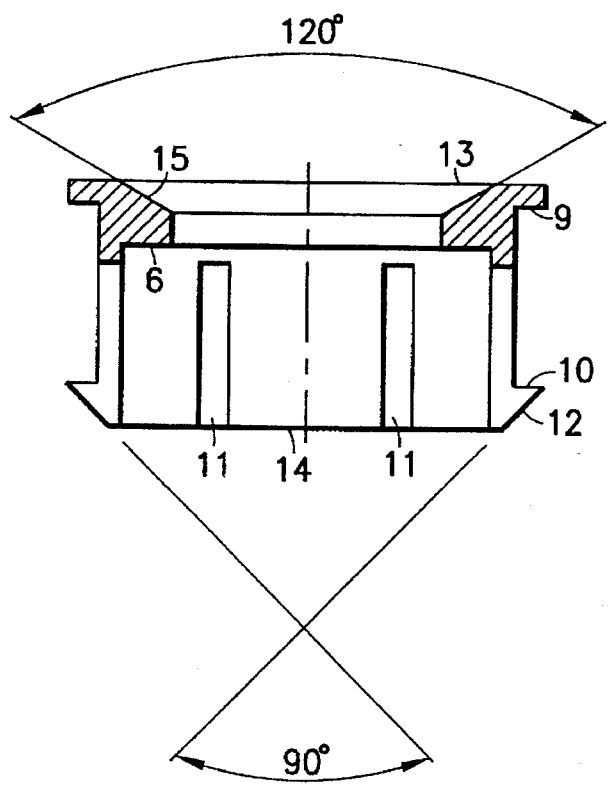

A series of longitudinal cuts (six in the embodiment shown in FIG. 3, each spaced 60° from its adjacent neighbors) are provided which extend axially from the rear face 14 towards the front face 13 and end close to the inner step 6. This series of cuts is provided in order to increase the flexibility of the back portion of the bush 4 so as to facilitate its snapping into the hole of the back-panel 2.

The operation of the connection system in accordance with the invention is easy. Once bush 4 is snapped into the corresponding hole in the back-panel 2, the printed board 7 with respective electrical connector 8 is plugged in. Then connectors 1 are screwed to respective connectors 3 mounted on the printed board 7, through the respective bush 4, and in so doing the front portion of connector 1 comes into abutment on the inner step 6 of bush 4, and connector 3, matched with connector 1, comes into abutment on the front face 13 of bush 4.

Connectors 1 and 3 are then rigidly fixed to bush 4 and the latter, through the outer steps 9 and 10, to the back-panel 2.

Should one try to accidentally draw the printed board 7 out without having unscrewed the connectors 1, the stress that board 7 exerts on the connectors is transmitted through external step 10 on the back-panel 2 and not on fiber optic cable 5 which is therefore not damaged.

Thus the invention achieves the above mentioned objects. In fact, a connector system is provided between a printed board and a cable, in particular a fiber optic cable, having a connector connectable to rotation which is reliable and effective to prevent the breakage of the optical fibers due to attempts to draw out the printed board 7 prior to the disconnecting the associated connector(s). Moreover, the system in accordance with the invention has a structure that is easy and expensive to realize (the bush can be easily obtained by pressing in a very inexpensive way). The circular cross-section of the bush allows its insertion into holes already existing in the back-panel. Further, its flexibility deriving from axial cuts also allows its prising-up by compressing the rear portion thereof. While the invention has been described with reference to a specific embodiment thereof, it is to be understood that the invention is not restricted to the embodiment as described and illustrated, the invention being susceptible to those modifications and variations which are apparent to those skilled in the art. Such modifications and variations should be understood as falling within the scope of the attached claims.

For instance, the system in accordance with the invention is applicable also to electrical cables mounting connectors type N, BNC or the like. The shape of the bush can be changed using the concept of shifting the draw out stress on the back-panel.

Naturally, the material and dimensions can be changed according to the requirements of manufacturing and/or use.

I claim:

1. A connection system between a printed board (7) electrically connected to a back-panel (2) and connectable to at least one cable (5) through first connection means (3) rigidly fixed to said board (7) at the rear portion of the board and second connection means (1) fixedly connected at one end of said at least one cable (5) and having means for rotatable connection to said first connection means (3), characterized in that the connection system further comprises third connection means (4) fixedly connected to the back-panel and interposed between the first connection means and second connection means when said second connection means (1) are rotatably connected to said first connections means (3); so as to thereby prevent the connected first and second connection means from movement relative to said back-panel, whereby if removal of said board (7) is attempted while the second connection means is rotatably connected to the first connection means, the third connection means prevents said removal.

2. A connection system according to claim 1, characterized in that said third connection means (4) consist of a bush rigidly fixed to said back-panel having its front face (13) in abutment on said first connection means (3) and an inner step (6) against which said second connection means (1) come into abutment.

3. A connection system according to claim 2, characterized in that said bush (4) is snappable into a hole of said panel (2).

4. A connection system according to claim 2, characterized in that said bush (4) has a first external step (10) designed to come into abutment on the rear side of said panel (2).

5. A connection system according to claim 4, characterized in that said bush has a second external step (9) located at a distance from said first external step (10) greater than the thickness of said back-panel.

6. A bush for use in a connection system between a printed board electrically connected to a back-panel and to at least one cable as claimed in claim 1, characterized by a resilient body substantially in the form of a hollow cylinder having a front face (13) and a rear face (14) both in the form of an annulus and being provided with a circumferential groove on its external lateral surface forming a front external step (10), and being provided with an internal step (6) on its internal lateral surface in the vicinity of said front face (13), said body further having a first chamfer (12) at the external circumference of said rear face, a second chamfer (15) at the internal circumference of said front face and a plurality of cuts (11) axially extending from said rear face (14) towards and in the vicinity of said internal step (6) so as to make said body flexible at its rear portion.

7. A bush according to claim 6, characterized in that it is made from plastic.

8. A bush according to claim 6, characterized in that it is made from metal.

9. A bush according to claim 6, characterized in that said cuts are spaced 60° from each other.

* * * * *

UNITED STATES PATENT AND TRADEMARK OFFICE
CERTIFICATE OF CORRECTION

PATENT NO.  : 5,661,833
DATED       : August 26, 1997
INVENTOR(S) : Roberto Omati It is certified that error appears in the above-indentified patent and that said Letters Patent is hereby corrected as shown below:

On Title Page [30] "MI95A0605" should be --MI95A000605--

Signed and Sealed this

Fourth Day of November, 1997

Attest:

BRUCE LEHMAN

Attesting Officer

Commissioner of Patents and Trademarks